May 30, 1933.    G. I. GANN    1,912,188

ELECTRICAL FLUID TESTER

Filed April 2, 1930

Inventor
Geo. I. Gann
By E. E. Huffman
Att'y.

Patented May 30, 1933

1,912,188

UNITED STATES PATENT OFFICE

GEORGE I. GANN, OF ST. LOUIS, MISSOURI

ELECTRICAL FLUID TESTER

Application filed April 2, 1930. Serial No. 441,160.

My invention relates to apparatus for testing the chemical content of a fluid by measuring the resistance offered by such fluid to the passage through it of an electrical current. The specific form of apparatus shown and described is particularly adapted to determine the proportion of soda ash or similar chemicals contained in steam boiler water. Such chemicals are introduced into the feed water of steam boilers in the form of boiler compounds to prevent the formation of scale in the boiler. When, due to concentration owing to evaporation, the proportion of the chemicals becomes too high the objectionable condition known as "foaming" results. Testing devices of the type to which the present invention relates, are used to determine such concentration so that the overcharged water may be blown off before the condition of foaming is actually produced. Such testing devices are subject to two sources of error; one resulting from change in conductivity of the fluid due to changes in the temperature, and the other resulting from variation in the voltage of the battery or other source of current supply.

The object of my invention is to produce a testing device in which errors of the kind above referred to will be eliminated so that its indications will be dependent only on variation in conductivity of the fluid tested, due to the chemical composition of such fluid.

Figure 1:
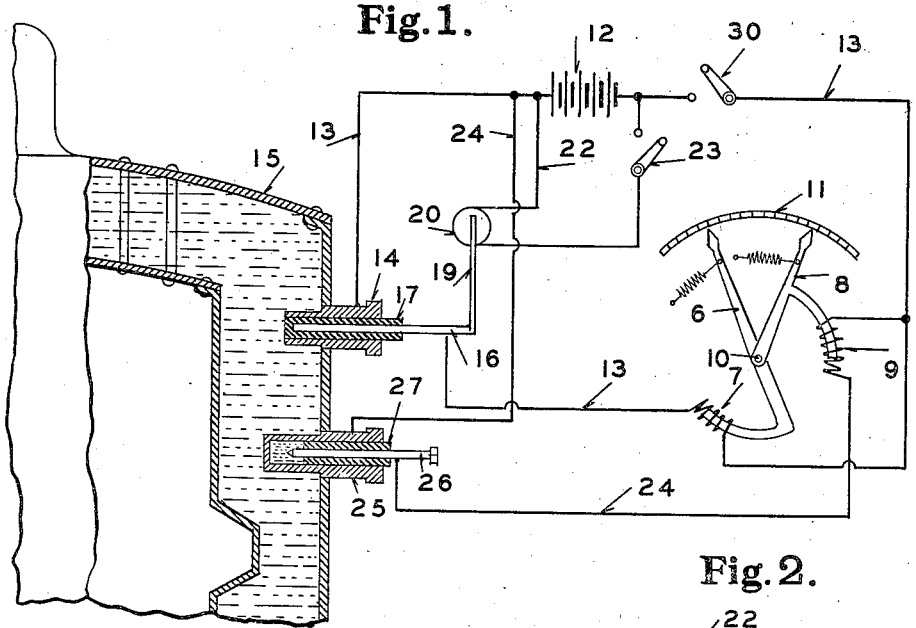
Figure 4:
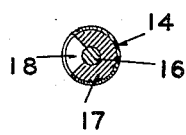
Figure 3:
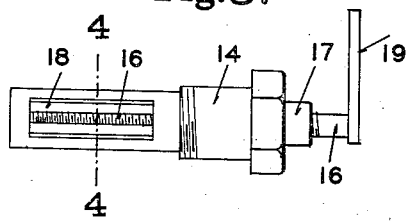
Figure 2:
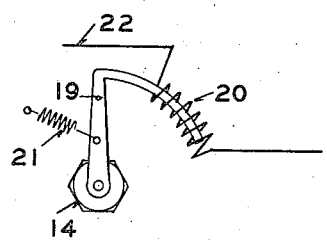
Figure 5:
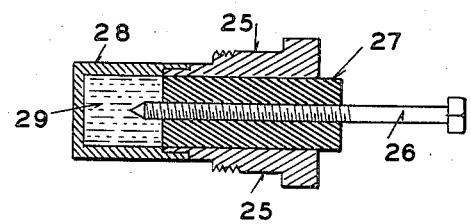

In the accompanying drawing, which illustrates one form of testing device made in accordance with my invention, Figure 1 is a diagrammatic view of the device together with a sectional view of a portion of a steam boiler to which the same is applied; Figure 2 is a diagrammatic view showing means for rocking the central electrode of one of the terminal plugs; Figure 3 is a side view of such plug; Figure 4 is a section taken on the line 4—4 of Figure 3; and Figure 5 is a longitudinal section through the other terminal plug.

In carrying out my invention I employ two electrical measuring instruments, one comprising an arm or pointer 6 and actuating solenoid 7, and the other a pointer 8 and actuating solenoid 9. The two pointers move on the same pivot 10 and cooperate with a common scale 11. The solenoids are so arranged that increase in the current passing through them moves the pointers in the same direction. Both solenoids are supplied with current from a battery 12, or other common source of E.M.F. Solenoid 7 and battery 12 are connected by a circuit 13 which also includes a resistance element in the form of a terminal plug 14 extending through the wall of a steam boiler 15, the water in which is to be tested. The shell of the plug 14 constitutes one electrode and a central cylindrical rod 16 the other electrode of the resistance element. Rod 16 is provided with threads snugly fitting corresponding threads in the interior of an insulating core 17. Adjacent to the inner end of the plug a segmental portion of both the core and the casing is cut away, as shown in Figures 3 and 4, so as to provide a V-shaped trough or gap 18 and expose a portion only of the periphery of the rod 16. Some of the water in the boiler will enter the gap 18 forming part of the circuit through solenoid 7 so that its conductivity will influence the amount of deflection of the pointer 6 when current from the battery flows through the circuit.

Sediment from the boiler water is liable to be deposited on the exposed portion of the rod 16. To remove such sediment before a reading is taken a rocking motion is imparted to the rod 16 to cause the edges of the core 17 to scrape off such deposit. Such rocking movement may be imparted manually by means of an arm 19. In order, however, to enable remote operation I provide a solenoid 20 for moving the arm in one direction, it being returned upon release of the pull of the solenoid by a spring 21. This solenoid may be supplied from any source of electric current but is preferably included in a circuit 22 shunted around the battery 12 and containing a switch 23 for making and breaking the circuit.

Solenoid 9 is contained in a circuit 24 in multiple with the circuit 13 and including a resistance element in the form of a terminal plug 25 projecting through the wall of the boiler 15. The shell of the plug forms one electrode of the resistance element, the other being formed of a threaded rod 26 extending through an insulating core 27. The inner end of the plug 25, which is preferably in the form of a removable cap 28, is hollow and contains a resistance liquid 29 bridging the electrodes. The liquid 29 may be any liquid varying in conductivity under the influence of temperature in the same manner as the liquid in the boiler. However, I prefer to use a portion of the boiler water itself containing the normal percentage of boiler compound. This liquid, being isolated from the boiler water, will remain constant in chemical content and its conductivity will vary only by reason of the variation in temperature of the boiler water by which it is surrounded. By rotating the threaded rod 26 its end may be caused to project a greater or less distance beyond the core 27 to adjust the resistance of the element 25 to that of the element 14 when immersed in boiler water containing the normal amount of boiler compound after which no further movement of the rod is necessary. A switch 30 is located at such point in the line wire as to control both the circuit 13 and the circuit 24.

In using my device to test the condition of the water the rod 16 is given a rocking movement to clean the part of the rod exposed to the boiler water from sediment. As above explained, this may either be accomplished manually or electrically through the opening and closing of the switch 23. The switch 30 is now closed, causing current from the battery to flow through solenoids 7 and 9, moving pointers 6 and 8 both in clockwise direction. If the amount of boiler compound in the water in the boiler is normal, both pointers will be moved an equal distance so that while their position is changed their angular relation will remain the same and consequently the number of included divisions on the scale 11 will be constant. Changes in temperature will cause variation in the amount of movement but will not change the angular relation of the pointers as they will cause equal variety in the conductivity of both resistance elements. The same is true of variations in the voltages of the battery which will affect both instruments alike and, while changing the amount of movement of the pointers, will not vary their angular relation. When, however, the percentage of boiler compound in the boiler water increases, the conductivity of the resistance element 14 will be increased without any corresponding increase in the conductivity of the resistance element 25, so that the pointer 6 will be moved a greater distance than the pointer 8 and their angular separation lessened with consequent decrease in the number of included divisions on the scale 11. When the decrease on the scale reading has reached a predetermined amount, preferably when the pointers coincide, the attendant will be warned that the point of foaming has been reached and that the chemically overcharged water must be blown off.

While I have shown and described a construction in which the pointers of the two instruments have the same pivot and cooperate with a common scale, any means, mechanical or otherwise, may be used to integrate the movement of the instruments so that the indication will be their resultant.

Having fully described my invention, what I claim as new and desire to secure by Letters Patent of the United States is:

1. In a device for testing liquids, an electrode consisting of a conducting rod surrounded by a body of insulating material, and means for causing relative movement between said rod and body to remove deposits from the former.

2. In a device for testing liquids, an electrode consisting of a cylindrical conducting rod surrounded by a body of insulating material having an opening exposing a portion only of the periphery of the rod, and means for causing relative rotary movement between the rod and the body to remove deposits from the former.

3. In a device for testing liquids, an electrode consisting of a cylindrical conducting rod threaded into a body of insulating material, said body being provided with an opening exposing a portion only of the periphery of the rod, and means for imparting a rocking movement to the rod to remove deposits therefrom.

In testimony whereof, I hereunto affix my signature, this 28th day of March, 1930.

GEORGE I. GANN.